United States Patent [19]
Alien et al.

[11] 3,947,628
[45] Mar. 30, 1976

[54] DEVICE FOR SELECTIVE SEARCH OF OBJECTS USING IMAGES THEREOF

[76] Inventors: Imant Karlovich Alien, ulitsa Raunas, 45, kv. 32; Jury Olegovich Popov, ulitsa Veidenmauma, 24. kv. 3; Lev Isaakovich Stolov, ulitsa Daugavgrivas, 132/1, kv. 22; Boris Albertovich Yanson, ulitsa B. Altonovas, 8, kv. 1; Igor Alexandrovich Markov, ulitsa Gorkogo, 105, kv. 11; Anatoly Vasilievich Nikonenko, ulitsa Lokomativas, 98, kv. 16, all of Riga, U.S.S.R.

[22] Filed: Aug. 21, 1974

[21] Appl. No.: 499,182

[52] U.S. Cl. .......................... 178/6.8; 178/DIG. 21
[51] Int. Cl.² .......................................... H04N 7/18
[58] Field of Search ...................... 178/6.8, DIG. 21

[56] References Cited
UNITED STATES PATENTS

| | | | |
|---|---|---|---|
| 3,562,423 | 2/1971 | Murphy | 178/6.8 |
| 3,579,249 | 5/1971 | Dewey | 178/6.8 |
| 3,749,830 | 7/1973 | Blitchington | 178/6.8 |

*Primary Examiner*—Howard W. Britton
*Attorney, Agent, or Firm*—Holman & Stern

[57] ABSTRACT

A device for selective search of objects using images thereof, comprising a number of units connected in series, viz.: a TV-camera producing video signals of the object's image, including a scanner and a synchronizer and determining the current values of geometric parameters of the object's image; an amplitude selector whose video signal clipping level is adjusted according to the preset level of the brightness and chromaticity of the object's image; a servomechanism controlling displacements of said objects relative to the TV-camera; and an initiating pulse oscillator connected to said servomechanism. According to the invention, the device is provided with a logical unit connected in series between the amplitude selector and the servomechanism and coupled to said initiating pulse oscillator, and with a TV-camera raster reference line sensor connected to said logical unit. The logical unit serves to preset the reference values of geometric parameters of the object's image, to measure the current values of geometric parameters of the object's image at a preset brightness and chromaticity levels and to compare them with the reference values. The purpose of the reference line sensor is to pick out any one of the TV-camera raster lines to be used as a reference line for said measurements of the current values of geometric parameters of the object's image at the moment when they cross the raster line in the course of mutual displacements of the object and the TV-camera.

6 Claims, 8 Drawing Figures

DEVICE FOR SELECTIVE SEARCH OF OBJECTS USING IMAGES THEREOF

FIELD OF THE INVENTION

The present invention relates to devices for recognition of patterns by analysing sets of their informative parameters and, in particular, to devices for selective search of objects using images thereof.

BACKGROUND OF THE INVENTION

The invention can be advantageously used to search, guide and track objects within the field of view of a scanning raster line. It can be employed in systems intended to analyse the structures of complex half-tone images of various micro- and macro-objects. In particular, it can be used in astronomy to automatically track stars and planets; in biology, to perform selective search of individual objects for their detailed analsyis on the basis of the parameters of their images; in metallography, to analyse the structures of polished specimens; in medicine, to study various objects, such as cytology preparations for their analysis. In addition, it can be used to solve other applied and scientific problems where it is required that the process of successively selecting images of objects and passing them to a measurement or identification system should be automatic.

Included in the prior art is a device which selectively searches for and tracks an object using its image and which comprises a video pickup, a photoelectric scanner, a video signal processor and a servomechanism to displace the video pickup with respect to the image being searched.

This device comprises an optical telescope aimed at a celestial body. The image of the celestial body is focused optically on a photoelectric scanner that converts the image into a series of pulses whose time of generation determines the distance between the fixed coordinate axis and the circumference of the celestial body's image. Then, the pulses are differentiated and the resulting signals are fed to a computer which calculates the coordinates of the center of the celestial body.

A drawback of the known device lies in that its application is rather limited since it is preprogrammed to solve a single specific proble, viz, as a horizon sensor, to find the vertical to a partially darkened plant. Hence, the device cannot be used to selectively search for an object whose image is against the background of a random set of mixed objects having different contrasts, chromaticities and geometric sizes. Nor can it be used in systems requiring that images of objects should be automatically passed in succession for further analysis, since to have a system track an object it is necessary to manually pre-aim the optical means of the device at the object.

OBJECT OF THE INVENTION

It is an object of the present invention to provide a device for selective search of objects using images thereof, for systems intended to analyse structures of complex half-tone images of various micro- and macro-objects.

SUMMARY OF THE INVENTION

This and other objects are achieved by that a device for selective search of objects using images thereof, which comprises four subsystems connected in series, viz. a TV-camera serving as a video pickup of the object's image, containing a scanner and a synchronizer and determining the current values of the geometric parameters of the object's image; an amplitude selector wherein the level of video signal clipping is adjusted according to a preset level of brightness and chromaticity of the object's image; a servomechanism controlling mutual displacements of the objects and the TV-camera; and an initiating pulse oscillator coupled to the servomechanism. According to the invention, a logical unit is connected in series between the amplitude selector and the servomechanism, coupled to said oscillator and intended to perform the following functions: preset the values of reference geometric parameters of the objects image; measure the current values of the geometric parameters of the object's image at preset brightness and chromaticity levels and compare the current and reference geometric parameters. The device also includes a reference line sensor connected to said logical unit to sample at least one line from the TV-camera raster, which line is to be used to measure the current values of the geometric parameter of the object's image at the moment of their crossing said reference line in the course of said mutual displacements of the object and the TV-camera.

It is preferable that the device should comprise an electronic aperture unit whose two inputs are connected to the output of the TV-camera and whose other inputs and output are connected to the logical unit, the aperture unit serving to set the boundaries of that section of at least one reference line within which the current values of the geometric parameters of the object's image are to be measured.

The logical unit may include: a measuring pulse counter whose complementing input is connected, via a first coincidence circuit, to the amplitude selector. A zero reset input is connected to the output of a shaper of reset pulses corresponding to the trailing edges of pulses fed to its input from the amplitude selector, while the second input of the first coincidence circuit is connected to a measuring pulse oscillator. A second and a third coincidence circuits have first inputs connected to the output of the measuring pulse counter, and second inputs connected to the reference line sensor. Third inputs are connected to one of the outputs of a commutation flip-flop. The outputs of the second and third coincidence circuits are connected directly to the servomechanism and, via a collecting circuit, to one of the inputs of the commutation flip-flop, while the other input of the latter is connected to the initiating pulse oscillator.

The logical unit may also comprise a measuring pulse counter whose complementing input is connected, via the first coincidence circuit, to the amplitude selector, the zero reset input is connected to the output of the shaper of reset pulses that correspond to the trailing edges of pulses applied to the input of the reset pulse shaper from the amplitude selector, while the second input of the first coincidence circuit is connected to the measuring pulse oscillator; second and third coincidence circuits whose first inputs are connected to the output of the measuring pulse counter, the second inputs are connected to the reference line sensor, the third inputs are connected to one of the outputs of the commutation flip-flop, while their outputs are connected to the servomechanism directly and, via a collecting circuit, to one of the inputs of the commutation flip-flop; a fourth coincidence circuit whose first input is connected to the output of the measuring pulse counter, the second input is connected to the electronic aperture unit, the third input is connected to the second output of said commutation flip-flop, the fourth input is connected to one of the inputs of an additional commutation flip-flop whose first input is connected to the initiating pulse oscillator, while the output of the fourth coincidence circuit is connected to the servomechanism and to the electronic aperture unit. The logical unit may also include a tracker assembly comprising a fifth and a sixth coincidence circuits, whose first inputs are connected to the second output of the additional commutation flip-flop, the second input of the fifth coincidence circuit is connected to the output of the measuring pulse counter, the third input of the fifth coincidence circuit is connected to the electronic aperture unit, the second input of the sixth coincidence circuit is connected to the TV-camera frame pulse output via a shaper of frame pulse trailing edges, while the outputs of these coincidence circuits are connected to a search enable flip-flop whose output is connected, via an additional coincidence circuit, to the other input of the electronic aperture unit and to other inputs of the commutation flip-flops, while the second input of this additional coincidence circuit is connected to the TV-camera frame pulse output via the shaper of the leading edges of frame pulses. The reference line sensor may further comprise a counter of double line frequency pulses and two decoders whose inputs are connected to the outputs of this counter, the complementing input of the said counter being connected to the TV-camera double line frequency output, a zero reset input being connected to the TV-camera frame synchronizing pulse output, the outputs of the decoders being connected to the inputs of the logical unit via respective coincidence circuits, and the other inputs of said coincidence circuits being connected to the TV-camera blanking pulse output.

It is preferred that the electronic aperture unit should comprise at least two groups of counters to count horizontal and vertical position coordinates of the object's, image and of the beam in the raster, respectively, each group comprising a counter of the current coordinates of the beam's position in the raster and two counters of the coordinates of the position of the object's image in the raster coupled to each other via circuits comparing these coordinates. The first input of each one of these comparison circuits is connected to the output of the counter of object image position coordinates, the second input is connected to the output of the counter of current beam position coordinates, while the outputs of these comparison circuits are coupled to the inputs of respective flip-flops and to the first inputs of respective coincidence circuits whose second inputs are interconnected and coupled to one of the outputs of the logical unit, the output of the flip-flop in each group being connected to the input of the logical unit via a coincidence circuit common for both groups. The complementing inputs of the counters of object position coordinates on the raster are connected to the outputs of respective coincidence circuits, the complementing inputs of the counter of current beam position coordinates on the raster are connected to the TV-camera line synchronizing pulse output and to the TV-camera frame synchronizing pulse output, respectively, the complementing input of the counter of current beam position coordinates on the raster is connected to a count pulse oscillator and the zero reset input of this counter is connected to the TV-camera line synchronizing pulse output, while the reset inputs of all the counters of object position coordinates are connected to one of the outputs of the logical unit.

DESCRIPTION OF THE DRAWINGS

The invention will be better understood from the following detailed description of a preferred embodiment thereof with reference to the accompanying drawings, in which.

DISCUSSION OF THE PREFERRED EMBODIMENT

Figure 1:
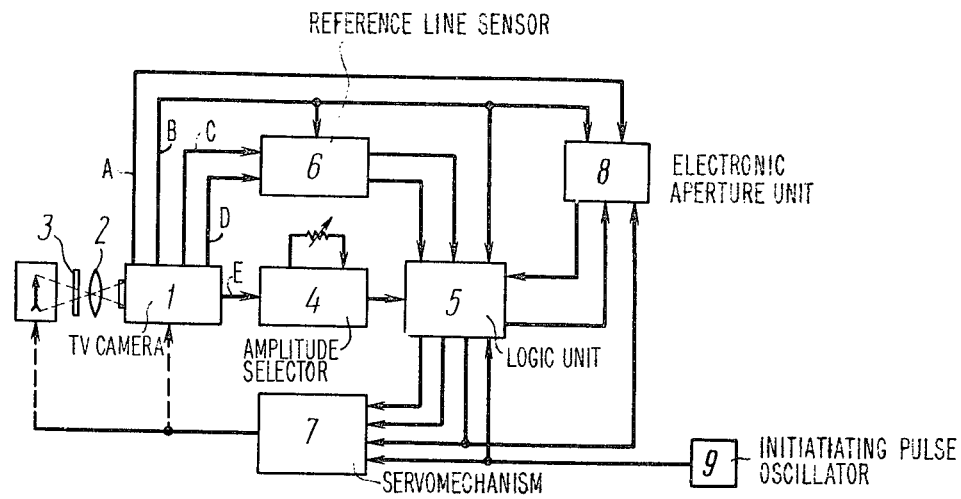
FIG. 1 is a general block diagram of a device for selective search of objects using images thereof, according to the invention.

The proposed device for selective search of objects using images thereof comprises a TV-camera 1 (FIG. 1) having a scanner with an output E and a synchronizer with outputs A, B, C and D. When the image of an object is subjected to line and frame scanning, the TV-camera produces an output video signal containing data on the current values of the geometric parameters of the image (in FIG. 1 the TV-camera system is shown by an arrow). The object's image can be projected onto the light-sensitive surface of the TV-camera with the aid of an optical system 2 and a set of gauged optical filters 3 for presetting the chromaticity of the object's image.

Connected to the output E of the TV-camera 1 is an amplitude selector 4 whose video signal clipping level is adjusted according to the preset level of the brightness and chromaticity of the object's image. The amplitude selector 4 is designed as a conventional limiting amplifier with an adjustable threshold of video signal clipping. It serves for bilateral clipping of the video signal amplitude at a level which corresponds to the preset brightness and chromaticity of the object's image.

Connected to the output of the amplitude selector 4 is a logical unit 5 which performs the following operations: presets the values of reference geometric parameters of the object's image expressed by a number of pulses proportional to preset linear dimensions of images of objects, that are crossed by raster lines; measures the current values of geometric parameters of a given object's image at preset brightness and chromaticity levels, expressed by a number of pulses proportional to the current linear dimensions of the object's images; compares these two sets of values.

The functional features of the logical unit 5 can be best shown when it is described in conjunction with a reference line sensor 6 whose inputs are connected to a blanking pulse output C, a double line frequency pulse output D, and a frame synchronizing pulse output B of the synchronizer of the TV-camera 1. The outputs of the reference line sensor 6 are connected to the inputs of the logical unit 5. The reference line sensor 6 serves to select at least one of the TV-camera raster lines to be used in the logical unit 5 to measure the current values of the geometric parameters of the object's image when the latter is being crossed by said raster line. Due to the fact that both units operate in conjunction, it becomes possible to determine the position of the object's image on the TV-camera raster. Data on the current position of the object's image on the raster are used to control a servomechanism 7, wherefor the outputs of the logical unit 5 are connected to the inputs of the servomechanism 7. The servomechanism 7 comprises servomotors (not shown) serving to displace the object's image along the horizontal and vertical axes, respectively.

The servomechanism 7 is coupled to the TV-camera 1 and to a base plate carrying the objects to be analysed, e.g. to the objective table of a microscope (in the drawings, these couplings are shown by dashed lines).

In case the objects to be analysed are inaccessible as, for instance, in astronomy, it is necessary to vary the view angle of the TV-camera 1 with respect to the object ensuring thereby mutual displacements of the object's image and the TV-camera 1. The same procedure is resorted to in case photos of the object are arranged on the objective table of a microscope.

The device is provided with an initiating pulse oscillator 9 whose output is connected to the outputs of the logical unit 5 and to those of the servomechanism 7.

It is preferable that the device for selective search of objects using images thereof should be provided with an electronic aperture unit 8 which has its inputs connected to the frame frequency output B and to the line frequency output of the synchronizer of the TV-camera 1, as well as to the outputs of the logical unit 5. The output of the electronic aperture unit 8 is connected to one of the inputs of the logical unit 5. The electronic aperture unit is intended to limit that section of at least one reference line on the raster where the current values of geometric parameters of the object's image are being measured.

The logical unit in the present embodiment of the proposed device comprises a measuring pulse counter 10 (FIG. 2) whose complementing input I is connected to the output of the amplitude selector 4 (FIG. 1) via a first coincidence circuit 11. Connected to the second input of the coincidence circuit 11 is the output of a measuring pulse oscillator 12. The zero reset input II of the measuring pulse counter 10 is connected to the output of the amplitude selector 4 via a shaper 13 of reset pulses that correspond to the trailing edges of pulses applied to its input from the amplitude selector 4. The reset pulse shaper 13 can be arranged, for instance, as a differentiating unilateral clipper circuit.

The logical unit 5 also comprises two coincidence circuits 14 (the second) and 15 (the third) which have their first inputs I connected to the output of the measuring pulse counter 10, their second inputs II connected to the respective outputs of the reference line sensor 6 and their third inputs III connected to one of the inputs of a commutation flip-flop 16. The outputs of the coincidence circuits 14 and 15 are connected directly to the outputs of the servomechanism 7 and, via a collecting circuit 17, to one of the inputs of the commutation flip-flop 16. In the embodiment under consideration, the other input of the commutation flip-flop 16 is connected to the initiating pulse oscillator 9.

If the present embodiment employs the electronic aperture unit 8 (FIG. 1), the logical unit 5 additionally comprises a fourth coincidence circuit 18 (FIG. 2) and a tracker assembly 19. One of the inputs I of the concidence circuit 18 is connected to the output of the measuring pulse counter 10. The second input II of this coincidence circuit 18 is connected to the output of the electronic aperture unit 8. The third input III and the fourth input IV of the coincidence circuit 18 are connected to one of the outputs of the commutation flip-flop 16 and to the output of an additional commutation flip-flop 20, respectively. The output of the coincidence circuit 18 is connected to the input of the servomechanism 7 and to the input of the electronic aperture unit 8.

The tracker unit 19 (FIG. 2) comprises a fifth coincidence circuit 21 which has one of its inputs I connected to the output of the measuring pulse counter 10, and the other input II, connected to the output of the electronic aperture unit 8. A sixth coincidence circuit 22 has its first input I connected in parallel with the third input III of the fifth coincidence circuit 21 and, at the same time, to the other output of the additional commutation flip-flop 20. The second input of the sixth coincidence circuit 22 is connected to the frame synchronizing pulse output B of the TV-camera synchronizer. It is connected via a shaper circuit 23 which produces pulses corresponding to the trailing edges of said frame synchronizing pulses.

The outputs of said fifth and sixth coincidence circuits 21 and 22 are connected to the respective inputs of an enabling flip-flop 24. The output of the enabling flip-flop 24 is connected to the first input I of an additional coincidence circuits 25. The second input II of the coincidence circuit 25 is connected to the frame synchronizing pulse output B of the TV-camera synchronizer. It is connected via a shaper circuit 26 which produces pulses corresponding to the leading edges of the frame synchronizing pusles. The output of the additional coincidence circuit 25 is connected to the inputs of the commutation flip-flops 16 and 20 and to the input of the electronic aperture unit 8.

In the embodiment under consideration, comprising the electronic aperture unit 8, the output of the initiating pulse oscillator 9 is connected to the second input of the additional commutation flip-flop 20.

Figure 3:
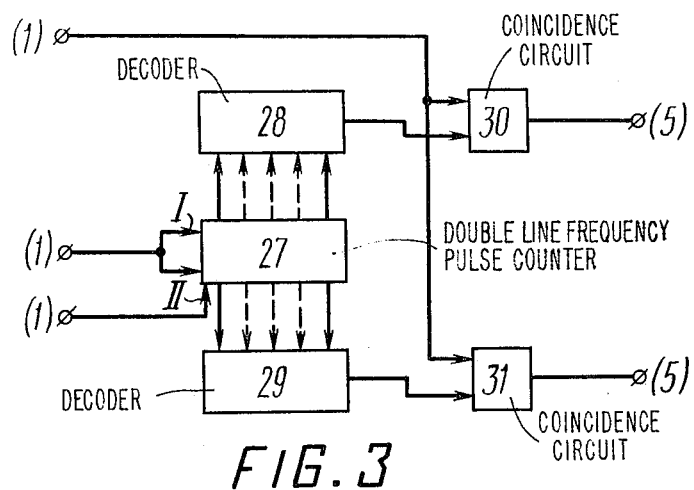
FIG. 3 is a circuit diagram of the reference line sensor, according to the invention.

The reference line sensor 6 (FIG. 1) comprises a double line frequency pulse counter 27 (FIG. 3) whose complementing input I and zero reset input II are connected to the double line frequency pulse output D and to the frame synchronizing pulse output B of the TV-camera synchronizer, respectively. The outputs of the counter 27 are connected, via decoders 28 and 29, to the first inputs of coincidence circuits 30 and 31. The second inputs of these coincidence circuits 30 and 31 are connected to the blanking pulse output C of the TV-camera synchronizer. The outputs of the coincidence circuits 30 and 31 are connected to the inputs of the logical unit 5.

The purpose of the reference line sensor 6 is to sample, out of a multitude of raster lines, one line that is intended to serve as a reference for measuring the current values of geometric parameters of the object's image.

The idea of selecting one of the raster lines to serve as reference is based on the fact that when the device operates in a certain rectangular system of coordinates which is fixed with respect to the raster, the number of each line will be one of the raster coordinates. Therefore, if the object's image is found on the given reference line, it is possible to determine the position of the object's image on the raster along one of its coordinate axes.

The use of two decoders (28 and 29) makes it possible to determine the second coordinates of the object's image which is crossed by the reference line of the raster. The functions of a reference line can be performed by a group of raster lines. In this case, the geometric parameters of the object's image to be measured will be the area of the image, its vertical dimensions, the shape, the perimeter (the length of the contour) and other values describing the image of a flat figure.

The electronic aperture unit 8 (FIG. 1) comprises two groups of counters. One group, containing counters 32, 33 and 34 (FIG. 4), corresponds to the horizontal coordinates of the object's image on the raster and to the current coordinates of the beam's position on the raster. The other group of similar counters 35, 36 and 37 corresponds to the vertical coordinates of the object's image on the raster and to the current coordinates of the beam's position on the raster.

Figure 7:
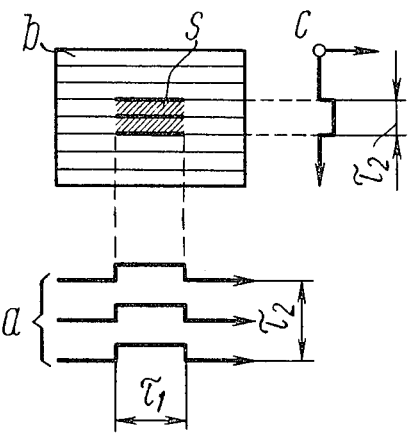
FIG. 7 and FIG. 8 are timing diagrams of the operation of the electronic aperture unit, according to the invention.

These groups of counters select a certain limited area S of the raster (FIG. 7) which is preset by the dimensions of the reference image. It is within this area that the current values of geometric parameters of the object's image are fixed (registered). Each group of the counters 32, 33, 34 and 35, 36, 37 (FIG. 7) of horizontal and vertical coordinates of the object's image and beam's positions in the raster comprises one counter (33 and 36) of the current coordinates of the beam's position on the raster and two counters (32, 34 and 35, 37) of the coordinates of the position of the object's image on the raster. The outputs of said counters 32, 34 and 35, 37 are connected to respective inputs of comparison circuits 38, 39 and 40, 41 whose outputs are connected to respective inputs of flip-flops 42 and 43 as well as to one of the inputs of respective coincidence circuits 44, 45 and 46, 47.

The outputs of said coincidence circuits 44, 45 and 46, 47 are connected to the complementary input I of respective counters 32, 34 and 35, 37 of the coordinates of the position of the object's image on the raster. The complementary input I of the counter 33 of the current horizontal coordinates of the beam's position on the raster is connected to the line synchronizing pulse output A of the synchronizer of the TV-camera 1.

The zero reset input II of the counter 33 of the current horizontal coordinates of the beam's position on the raster is connected to the frame synchronizing pulse output B of the synchronizer of the TV-camera 1.

The complementary input I of the counter 36 of the current vertical coordinates of the beam's position on the raster is connected to the output of a counter pulse oscillator 48.

The zero reset input II of said counter 36 of the current vertical coordinates of the beam's position on the raster is connected to the line synchronizing pulse output A of the synchronizer of the TV-camera 1.

The coordinate setting inputs II of the counters 32, 34, 35 and 37 of the coordinates of the position of the object's image on the raster, forming said two groups, are connected to the output of the coincidence circuit 25 (FIG. 2) of the logical unit 5.

The outputs of the flip-flops 42 and 43 (FIG. 4) are connected, via a common coincidence circuit 49, to the input II of the coincidence circuit 18 (FIG. 2) in the logical unit 5. The second inputs II of the coincidence circuits 44, 45 and 46, 47 are interconnected and coupled to the output of the coincidence circuit 18 (FIG. 2) in the logical unit 5 (FIG. 1).

The device operates as follows.

Figure 5:
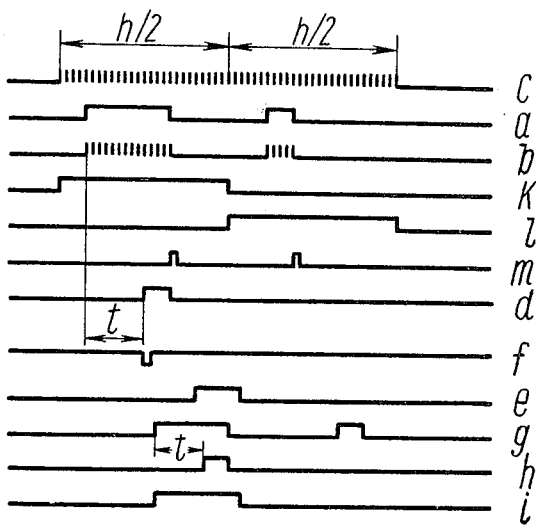
FIG. 5 is a timing diagram of events during the object search procedure and the aperture setting process in the logical unit, according to the invention.

When a signal from the initiating pulse oscillator 9 (FIG. 1) is applied to the servomechanism 7, the latter produces a command for one of the servomotors to start operating (not shown). The latter ensures mutual displacement of the object's image with respect to the raster of the TV-camera 1. The image moves in a direction normal to the raster lines. A video signal from the output E of the TV-camera 1 is fed to the amplitude selector 4 which ensures bilateral clipping of this signal at a level which corresponds to the preset brightness and chromaticity of the image. The amplitude selector 4 generates pulses applied to the input of the logical unit 5, the width of the pulses being proportional to the lengths of the object's image chords indicative of the geometric parameters of the objects. The logical unit 5 measures the durations of said pulses proportional to the lengths of the object's image chords. To do this, the unit counts the number of the measuring pulses which fill these pulses and compares it with the number of measuring pulses, which corresponds to the preset reference dimensions of the object's image. The above measurements and comparisons are performed on, at least, one raster line which serves as a reference line preset by the reference line sensor 6. The pulse corresponding to the number of said reference line is applied to the input of the logical unit 5 in the form of a voltage enabling the unit to perform the above operations. In order to determine the position of the object's image on the raster, the reference line pulse is divided into two portions (FIG. 5 $k$ and $l$) in the present embodiment. Depending on the position of the object's image on the raster of the TV-camera 1, one of the two outputs of the logical unit 5 connected to the servomechanism 7 produces a signal, and if the dimensions of the object's image exceed those of the preset reference values, this signal will show the position of the object's image on the raster, disable the servomotor for vertical displacement of the image and enable the servomotor for horizontal displacement thereof. To proceed to the selective search of the next object's image, the initiating pulse oscillator 9 is switched on again.

The selective search of an object's image using additional geometric parameters peculiar of a flat figure is carried out with the aid of the electronic aperture unit described above. In this case, the logical unit 5 will perform the following additional functions. The above mentioned signal of the position of the object's image is used to disable the signal applied from the output of the reference line sensor 6, and the logical unit 5 measures and correlates the object's image parameters only in that section on the raster which is limited by the signal fed from the output of the electronic aperture unit 8.

These signals are presented in the form of a series of gating pulses occupying a certain section of the raster area.

The initial position of the gating pulses in the time domain on the raster is selected in accordance with the preset reference dimensions of the object's image.

When pulses proportional to the chords of the object's image coincide in time with said gating pulses, the servomechanism 4 receives a command to stop the servomotors while the electronic aperture unit 8 will receive a signal specifying the dimensions of the raster areas to be scanned.

The comparison of the pulses produced by the electronic aperture unit 8 with the pulses arriving from the amplitude selector 4 gives the values of the current coordinates of the object's image and establishes the maximum dimensions of the latter in the electronic aperture unit 8.

The object's image as discriminated by the electronic aperture can be transferred to any of the known measuring systems for a detailed analysis of its structure. As soon as the analysis of this image structure is over, the initiating pulse oscillator 9 produces another command to start the selective search of the next object's image.

The logical unit of the device operates as follows.

Figure 2:
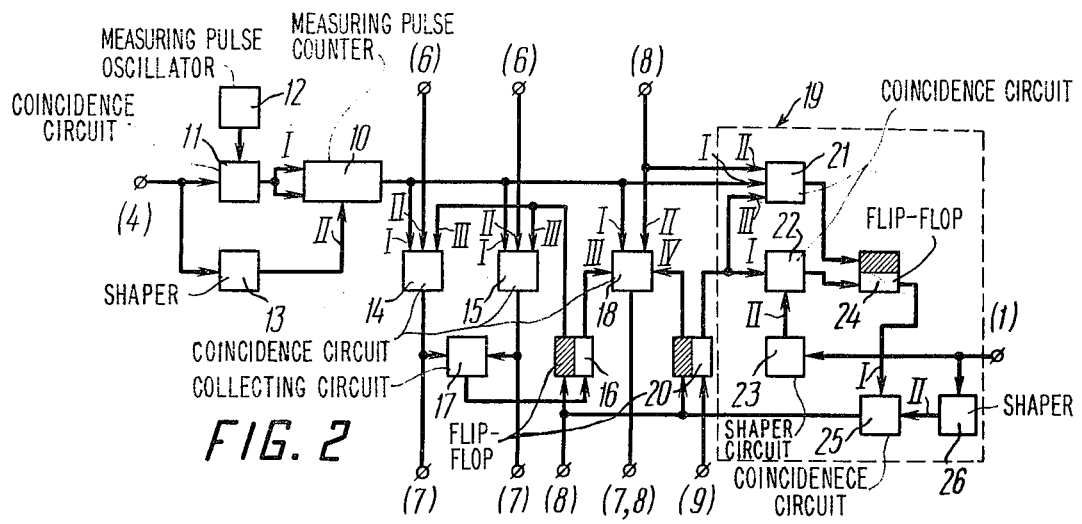
FIG. 2 is a circuit diagram of the logical unit, according to the invention.

Applied from the output of the amplitude selector 4 to the input of the first coincidence circuit 11 (FIG. 2) are pulses (FIG. 5a) the duration of which is proportional to the lengths of the object's image chords being crossed by the raster lines of the TV-camera 1. The output of the coincidence circuit 11 (FIG. 2) produces trains of pulses (FIG. 5b) with a duty cycle determined by the frequency of the measuring pulse oscillator 12 (FIG. 5c). The number of pulses in each train is counted by the counter 10 (FIG. 2). The digit capacity of the counter 10 is selected in accordance with the present reference geometric dimensions of the object's image so that when the dimensions of the real object's image exceed those of the reference one, the counter 10 output will produce a voltage (FIG. 5d) to be applied to the second, third and fourth coincidence circuits 14, 15, 18 (FIG. 2) and to the tracker assembly 19. If the fact that the length of the object's image chord exceeds that of the reference value coincides in time with one of the pulses (FIG. 5e) arriving from the reference line sensor 6, the second coincidence circuit 14 or the third coincidence circuit 15, respectively, will produce a signal (FIG. 5f) which is fed to the servomechanism 7 (FIG. 1) causing the latter to produce a command to stop the servomotor and a command to displace the object's image either to the left or to the right, respectively. Simultaneously, derived at the output of the collecting circuit 17 is a signal operating the commutation flip-flop 16 which disables the second and third coincidence circuits 14 and 15 and enables the fourth coincidence circuit 18. When the object's image being displaced arrives to the section of the raster limited by aperture gating pulses (FIG. 5e and g) which are applied to one of the inputs of the fourth coincidence circuit 18 from the output of the electronic aperture unit 8 (FIG. 1), with a pulse being derived at the output of the coincidence circuit 18, (FIG. 5h) which serves to adjust the gating pulses of the electronic aperture unit 8 or, more exactly, to change the size of the electronic aperture. Simultaneously this pulse serves as a command to stop the servomotors.

Derived at the output of the electronic aperture unit 8 are gating pulses (FIG. 5i) whose positions on the TV-camera raster correspond to the maximum dimensions of the object's image.

Included in the logical unit 5 is a number of additional elements serving "to bring" a subsequent object's image out of the electronic aperture area.

Figure 6:
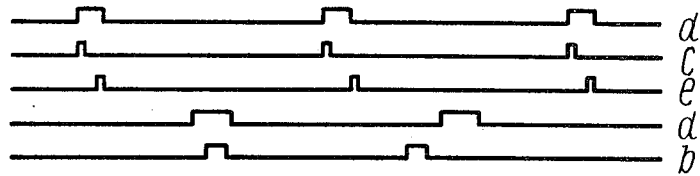
FIG. 6 is a timing diagram of the operation of the tracker assembly in the logical unit, according to the invention.

To this end, a pulse arrives to the input of the servomechanism 7 at the moment the initiating pulse oscillator 9 (FIG. 1) is turned on. This pulse triggers the servomotor serving to displace the object's image vertically across the raster of the TV-camera 1. Simultaneously the same pulse arrives to the input of the commutation flip-flop 16 (FIG. 2) which cuts off the coincidence circuits 14 and 15 and enables the coincidence circuit 18. If a part of the object's image with a chord exceeding the preset reference dimensions (FIG. 6b) happens to fall within the duration of the electronic aperture gating pulse (FIG. 6a) during the scanning period, the additional coincidence circuit 25 will be disabled at its input controlled by the enabling flip-flop 24 at the beginning of the subsequent leading edge (FIG. 6c) of the frame synchronizing pulse (FIG. 6d) which is applied to the coincidence circuit 25. This is ensured due to the fact that said flip-flop 24 will be operated by a signal arriving from the output of the fifth coincidence circuit 21. By the moment when a subsequent frame starts being scanned, the enabling flip-flop 24 will enable the coincidence circuit 25 since this flip-flop will be driven to the opposite stable state by the second leading edge (FIG. 6e) of the frame synchronizing pulse (FIG. 6d) which passes via the enabled sixth coincidence circuit 22 from the shaper 26.

If the object's image does not appear within the electronic aperture pulse in the next scanning frame, the coincidence circuit 25 will be enabled and the leading edges of the frame synchronizing pulses passing via the shaper 23 and said additional coincidence circuit 25, will drive the flip-flops 16 and 20 to the opposite stable state and also reset to zero the counters 32, 34, 35 and 37 in the electronic aperture unit 8. Thus, the entire system becomes ready for the selective search of a next object's image.

Consider now the operation of individual units of the device in greater detail.

The complementing input I of the counter 27 (FIG. 3) receives double line frequency pulses. Appearing at the outputs of the decoders 28 and 29 are pulses (FIG. 5 k,l) which correspond to half the length of one of the raster lines serving as a reference line once during the period of an image scanning frame. To fix the positions of these pulses in the raster field the frame synchronizing pulses reset the counter 27 to zero. To limit the duration of reference line pulses and match it with the active part of the reference line the coincidence circuit 30 and 32 are fed with blanking pulses which arrive from the output C of the synchronizer in the TV-camera 1. The reference line pulses from the outputs of the coincidence circuits 30 and 31 are fed to the logical unit 5 to be correlated with pulses proportional to the lengths of the chords of the object's image.

Figure 4:
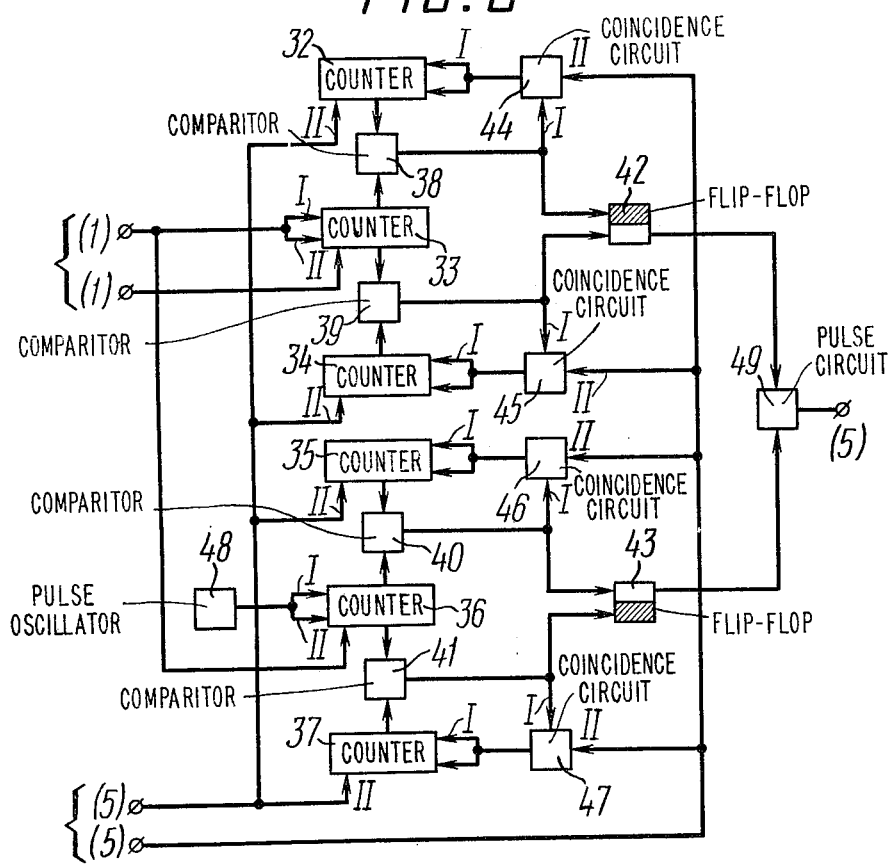
FIG. 4 illustrates the electronic aperture unit, according to the invention.

FIG. 4 is a block diagram of the electronic aperture unit 8 (FIG. 1) producing trains of gating pulses (FIG. 7a) which occupy definite positions S, in time, on the raster (FIG. 7b) of the TV-camera 1. The area of the raster limited by said gating pulses is what is known as electronic aperture or the electronic mask confining the above area.

Figure 8:
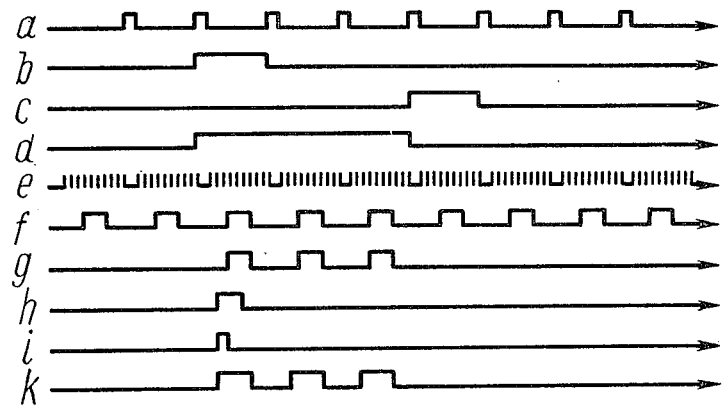

The gating pulses serving to produce a rectangular electronic aperture are shaped with the aid of two groups of similar counters 32, 33, 34 and 35, 36, 37. The first group of counters shape the pulse (FIG. 7c) whose leading and trailing edges correspond to the horizontal coordinates or, more exactly, to the numbers of the lines occupied by the electronic aperture on the raster of the TV-camera. To this end, the complementing input I of the counter 33 of the current horizontal coordinates of the beam's position on the raster is fed with line synchronizing pulses (FIG. 8a) arriving from the line synchronizing pulse output of the synchronizer of the TV-camera 1(FIG. 1). The zero reset input II of the same counter 33 is fed with frame synchronizing pulses arriving from the output B of the synchronizer of the TV-camera 1. In the initial position, the zero reset inputs II of the counters 32 and 34 of the horizontal coordinates of the positions of the object's image on the raster of the TV-camera are set to the state which corresponds to the coordinates of the preset reference dimensions of the object's image. At the moments when the readings of counter pairs 32, 33 and 33, 34 coincide, derived at the outputs of the comparison circuits 38 and 39 are pulses (FIG. 8 b,c) which drive the flip-flop 42 to one of its stable states. Derived at the output of the flip-flop 42 is a pulse (FIG. 8d) whose duration is equal to the time interval that corresponds to the number of lines making the difference between the readings of the counters 32 and 33. The counters 35, 36 and 37 of the second group operate in a similar manner. These counters shape gating pulses whose leading and trailing edges correspond to the vertical coordinates of the electronic aperture on the raster of the TV-camera 1. In the initial position, the zero reset inputs II of the counters 35 and 37 of the vertical coordinates of the position of the object's image on the raster of the TV-camera 1 are driven to the state that corresponds to the horizontal dimensions of the reference object's image.

The zero reset input II of the counter 36 of the current coordinates of the beam's position on the line in the raster of the TV-camera 1 is driven to the zero state by line synchronizing pulses which ensure that the beam position coordinates are read out in synchronism. Connected to the complementing input I of the same counter 36 is a count pulse oscillator 48 (FIG. 8e). At the moments when the readings of the counters 35, 36 and 36, 37 coincide in respective pairs, the outputs of the comparison circuits 40 and 41 will produce pulses to drive the flip-flop 43 to an opposite stable state. The output of this flip-flop 43 will produce pulses (FIG. 8f) whose lengths will be determined by the states of the counters 35 and 37. From the outputs of the flip-flops 42 and 43, said gating pulses indicative of the horizontal and vertical coordinates arrive to a common coincidence circuit 49 with a train of gating pulses (FIG. 8g) derived at its output, corresponding to the reactor area preset by the reference dimensions of the object's image. In case a part of the object's image coincides with one of the boundaries of the electronic aperture (FIG. 8b shows the pulse proportional to the chord of the object's image) in the course of the selective search of that object using the image thereof, the input of the respective coincidence circuit 44, 45, 46 or 47 connected to the output of the logical unit 5 (FIG. 1) will become conductive. Derived at the output of each respective circuit 44, 45, 46 or 47 is a pulse (FIG. 8i) driving the respective counter 32, 34, 35 or 37 the other stable state, due to which the boundary of the electronic aperture coinciding with the object's image will be displaced. The displacement of the electronic aperture boundaries will continue until the object's image is surrounded completely (FIG.8k). If necessary, the maximum dimensions of the electronic aperture can be limited by the preset maximum dimensions of the reference object's image by means of selecting the respective number of bits for the counters 32, 34, 35 and 37 of the coordinates of the position of the object's image.

I claim:

1. A device for selective search of objects using images thereof comprising: a TV-camera for producing video signals of the object's image and the current values of geometric parameters of the object's image; an amplitude selector whose input is connected to the output of said TV-camera for adjusting the video signal clipping level so that it corresponds to the preset brightness and chromaticity levels of the object's image; a logical unit connected to the output of said amplitude selector for presetting the reference values of geometric parameters of the object's image, to measure the current values of geometric parameters of the object at the preset brightness and chromaticity levels and to compare them with the reference values; a servomechanism for controlling the displacements of the object with respect to said TV-camera and having its input connected to the output of said logical unit and the output connected to produce relative motion between said TV-camera and said object; an initiating pulse oscillator connected to the inputs of said logical unit and said servomechanism; a reference line sensor connected to said logical unit for picking out at least one of the TV-camera raster lines to be used as the basis for said measurements of the current values of said geometric parameters of the object's image at the moment when the image crosses the raster line in the course of said mutual displacement of the object and said TV-camera.

2. A device as claimed in claim 1, further comprising an electronic aperture unit whose inputs are connected to the outputs of said TV-camera and whose outputs are connected to the inputs of said logical unit for limiting the area on at least one said reference line where said preset values of the object's geometric parameters are being measured.

3. A device for selective search of objects using images thereof comprising:
   a TV-camera for producing video signals of the object's image and the current values of geometric parameters of the object's image;
   an amplitude selector whose input is connected to the output of said TV-camera for adjusting the video signal clipping level so that it corresponds to the preset brightness and chromaticity levels of the object's image;
   a logical unit connected to the output of said amplitude selector for presetting the reference values of geometric parameters of the object's image, to measure the current values of geometric parameters of the object at the preset brightness and chromaticity levels and to compare them with the reference values;
   a servomechanism for controlling the displacements of the object with respect to said TV-camera and having its input connected to the output of said logical unit and the output connected to produce relative motion between said TV-camera and said object;
   an initiating pulse oscillator connected to the inputs of said logical unit and said servomechanism;
   a reference line sensor connected to said logical unit for picking out at least one of the TV-camera raster lines to be used as the basis for said measurements of the current values of said geometric parameters of the object's image at the moment when the image crosses the raster line in the course of said mutual displacement of the object and said TV-camera;

said logical unit further comprising:

a measuring pulse oscillator;

a first coincidence circuit provided with two inputs and an output, the first of said inputs being connected to said amplitude selector and the second of said inputs being connected to the output of said measuring pulse oscillator;

a shaper producing reset pulses that correspond to the trailing edges of pulses arriving from said amplitude selector and having its input connected to said amplitude selector;

a measuring pulse counter provided with a complementing input, a zero reset input and an output, said complementing input being connected to the output of said first coincidence circuit;

a second coincidence circuit provided with three inputs and an output, the first of said inputs being connected to the output of said measuring pulse counter, the second of said inputs being connected to said reference line sensor and said output being connected to said servomechanism;

a third coincidence circuit provided with three inputs and an output, the first of said inputs being connected to said output of said measuring pulse counter, the second of said inputs being connected to said reference line sensor, said output being connected to said servomechanism;

a collecting circuit provided with two inputs and an output, said inputs being connected separately to the respective outputs of said second and third coincidence circuits;

a commutation flip-flop provided with two inputs and two outputs, one of said inputs being connected to said third input of said coincidence circuit and to said third input of said third coincidence circuit, one of said outputs of said commutation flip-flop being connected to said initiating pulse oscillator and the second output being connected to the output of said collecting circuit.

4. A device for selective search of objects using images thereof comprising:

a TV-camera for producing video signals of the object's image and the current values of geometric parameters of the object's image;

an amplitude selector whose input is connected to the output of said TV-camera for adjusting the video signal clipping level so that it corresponds to the preset brightness and chromaticity levels of the object's image;

a logical unit connected to the output of said amplitude selector for presetting the reference values of geometric parameters of the object's image, to measure the current values of geometric parameters of the object at the preset brightness and chromaticity levels and to compare them with the reference values;

a servomechanism for controlling the displacements of the object with respect to said TV-camera and having its input connected to the output of said logical unit and the output connected to produce relative motion between said TV-camera and said object;

an initiating pulse oscillator connected to the inputs of said logical unit and said servomechanism;

a reference line sensor connected to said logical unit for picking out at least one of the TV-camera raster lines to be used as the basis for said measurements of the current values of said geometric parameters of the object's image at the moment when the image crosses the raster line in the course of said mutual displacement of the object and said TV-camera;

an electronic aperture unit having inputs connected to the outputs of said TV-camera and outputs connected to the inputs of said logical unit for limiting the area on at least one said reference line where said preset values of the object's geometric parameters are being measured;

said logical unit further comprising:

a measuring pulse oscillator, a first coincidence circuit provided with two inputs and one output, one of said inputs being connected to said amplitude selector and the second of said inputs being connected to the output of said measuring pulse oscillator;

a shaper of reset pulses that correspond to the trailing edges of pulses arriving from said amplitude selector, the input of said shaper being connected to said amplitude selector;

a measuring pulse counter provided with a complementing input, a zero reset input and an output, said complementing input being connected to the output of said first coincidence circuit;

a second coincidence circuit provided with three inputs and an output, the first of said inputs being connected to said output of said measuring pulse counter, the second of said inputs being connected to said reference line sensor, said output being connected to said servomechanism;

a third coincidence circuit provided with three inputs and an output, the first input being connected to said output of said measuring pulse counter, the second input being connected to said reference line sensor, and the output being connected to said servomechanism;

a collecting circuit provided with two inputs and an output, said inputs being connected separately to respective outputs of said second and third coincidence circuits;

a first commutation flip-flop provided with two inputs and two outputs, the first of said inputs being connected to said third input of said second coincidence circuit and to said third input of said third coincidence circuit, one of said outputs being connected to the output of said collecting circuit;

a fourth coincidence circuit provided with four inputs and an output, the first of said inputs being connected to said output of said measuring pulse counter, the second of said inputs being connected to said electronic aperture unit, the third of said inputs being connected to the second output of said first commutation flip-flop and said output being connected to said servomechanism and to said electronic aperture unit;

a second commutation flip-flop provided with two inputs and two outputs, the first of said inputs being connected to said measuring pulse oscillator, the second of said inputs being connected to the input of said first commutation flip-flop and to said electronic aperture unit and the first of said outputs being connected to said fourth input of said fourth coincidence circuit;

a tracker assembly comprising a fifth coincidence circuit provided with three inputs and an output, the first of said inputs being connected to the output of said measuring pulse counter, the second of said inputs being connected to said electronic aperture unit;

a sixth coincidence circuit provided with two inputs and an output, the first of said inputs being connected to said third input of said fifth coincidence circuit and to the second output of said second commutation flip-flop;

a pulse shaper whose input is connected to said TV-camera and whose output is connected to the second input of said sixth coincidence circuit;

an enabling flip-flop provided with two inputs and an output, the first of said inputs being connected to the output of said fifth coincidence circuit and the second of said inputs being connected to the input of said sixth coincidence circuit;

a leading edge pulse shaper whose input is connected to said TV-camera;

and an addtional coincidence circuit provided with two inputs and an output, the first of said inputs being connected to the output of said enabling flip-flop, the second of said inputs being connected to the output of said pulse leading edge shaper.

5. A device for selective search of objects using images thereof comprising:

a TV-camera for producing video signals of the object's image and the current values of geometric parameters of the object's image;

an amplitude selector whose input is connected to the output of said TV-camera for adjusting the video signal clipping level so that it corresponds to the preset brightness and chromaticity levels of the object's image;

a logical unit connected to the output of said amplitude selector for presetting the reference values of geometric parameters of the object's image, to measure the current values of geometric parameters of the object at the preset brightness and chromaticity levels and to compare them with the reference values;

a servomechanism for controlling the displacements of the object with respect to said TV-camera and having its input connected to the output of said logical unit and the output connected to produce relative motion between said TV-camera and said object;

an initiating pulse oscillator connected to the inputs of said logical unit and said servomechanism;

a reference line sensor connected to said logical unit for picking out at least one of the TV-camera raster lines to be used as the basis for said measurements of the current values of said geometric parameters of the object's image at the moment when the image crosses the raster line in the course of said mutual displacement of the object and said TV-camera;

said reference line sensor further comprising:

a double line frequency counter provided with a complementing input, a zero reset input and a number of outputs, and two decoders each being provided with a number of inputs the number of which corresponds to that of the outputs of said counter, and with one output;

two coincidence circuits, each being provided with two inputs and with an output, the first inputs of both coincidence circuits being interconnected and coupled to said TV-camera, the second inputs of said coincidence circuits being connected separately to respective outputs of said decoders, and the outputs of said coincidence circuits being connected to said logical unit.

6. A device for selective search of objects using images thereof comprising:

a TV-camera for producing video signals of the object's image and the current values of geometric parameters of the object's image;

an amplitude selector whose input is connected to the output of said TV-camera for adjusting the video signal slipping level so that it corresponds to the preset brightness and chromaticity levels of the object's image;

a logical unit connected to the output of said amplitude selector for presetting the reference values of geometric parameters of the object's image, to measure the current values of geometric parameters of the object at the preset brightness and chromaticity levels and to compare them with the reference values;

a servomechanism for controlling the displacements of the object with respect to said TV-camera and having its input connected to the output of said logical unit and the output connected to produce relative motion between said TV-camera and said object;

an initiating pulse oscillator connected to the inputs of said logical unit and said servomechanism;

a reference line sensor connected to said logical unit for picking out at least one of the TV-camera raster lines to be used as the basis for said measurements of the current values of said geometric parameters of the object's image at the moment when the image crosses the raster line in the course of said mutual displacement of the object and said TV-camera;

an electronic aperture unit whose inputs are connected to the outputs of said TV-camera and whose outputs are connected to the inputs of said logical unit for limiting the area on at least one said reference line where said preset values of the object's geometric parameters are being measured;

said electronic aperture unit further comprising:

at least one group of counters of the horizontal coordinates of the positions of the object's image and beam in the raster and at least one group of counters of the vertical coordinates of the positions of the object's image and beam in the raster;

said group of counters of the horizontal coordinates of the positions of the object's image and beam in the raster further comprising:

a first counter of the current coordinates of the beam's position in the raster, having a complementing input, a zero reset input and two outputs, and a second and third counters of the coordinates of the object's image position in the raster, each of said second and third counters being also provided with a complementing input, a zero reset input and an output;

a first and second comparison circuits, each being provided with two inputs and an output, each said input of said first comparison circuit being connected to the respective output of said first and second counters and each said input of said second comparison circuit being connected to the respective output of said first and third counters, and said complementing input, and said zero reset input of said first counter of the current coordinates of the beam's position in the raster being connected to said TV-camera;

first and second coincidence circuits, each being provided with two inputs and with an output, the first of said inputs of each coincidence circuit being connected to the output of the respective first and second comparison circuit, and said output of each of said coincidence circuits being connected to said complementing input of the respective second and third counter of the coordinates of the object's image position in the raster;

a first flip-flop with two inputs and an output, the first of said inputs being connected to said first input of said first coincidence circuit, the second of said inputs being connected to said first input of the second coincidence circuit;

said group of counters of the vertical coordinates of the positions of the object's image and beam in the raster further comprising:

a fourth counter of the current coordinates of the beam's position in the raster and having a complementing input, a zero reset input and two outputs, and fifth and sixth counters of the coordinates of the object's image position in the raster, each also having a complementing input, a zero reset input and one output;

a third and fourth comparison circuits, each having two inputs and one output, each of said inputs of said third comparison circuit being connected to the respective output of said fourth and fifth counters and each said input of said fourth comparison circuit being connected to the respective output of said fourth and sixth counters, and said zero reset input of said fourth counter of the coordinates of the beam's position in the raster being connected to said TV-camera;

a count pulse oscillator connected to the input of said fourth counter of the current coordinates of the beam's position in the raster;

said zero reset inputs of said second and third counters of the coordinates of the object's image position in the raster and belonging to said group of counters of the horizontal coordinates and said zero reset inputs of said fifth and sixth counters of the coordinates of the object's image position in the raster and belonging to said group of counters of the vertical coordinates being combined and connected to the output of said logical unit;

a third and fourth coincidence circuits each having two inputs and an output, the first input of each of said third and fourth coincidence circuits being connected to the output of the respective third and fourth comparison circuit and the output of each of said third and fourth coincidence circuits being connected to the complementing input of the respective fifth and sixth counter of the coordinates of said object's image position in the raster;

a second flip-flop with two inputs and an output, the first of said inputs being connected to the first input of said third coincidence circuits, the second of said inputs being connected to the first input of said fourth coincidence circuit;

said second input of said first and second coincidence circuits in said group of counters of the horizontal coordinates and said third and fourth coincidence circuits in said group of counters of the vertical coordinates are interconnected and coupled to the output of said logical unit;

a fifth coincidence circuit common for both groups of counters and provided with two inputs and an output, each of said inputs being connected to the output of the respective first and second flip-flops and said output being connected to said logical unit.

* * * * *